United States Patent Office 3,406,744
Patented Oct. 22, 1968

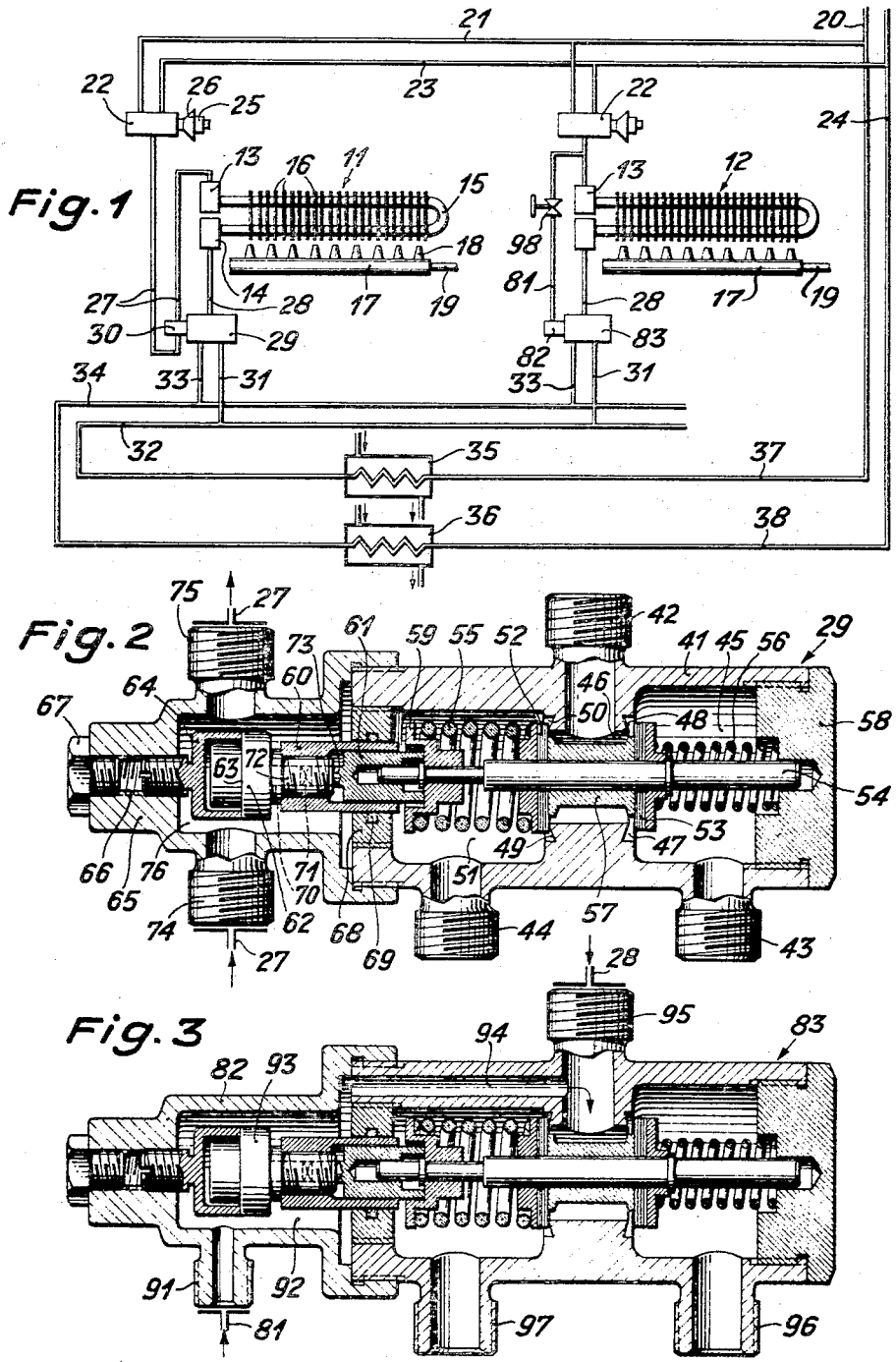

3,406,744
HEATING AND AIR-CONDITIONING APPARATUS
Eduard Scheibler, Dietikon, Switzerland, assignor to Sulzer Brothers Limited, Winterthur, Switzerland, a Swiss company
Filed Aug. 29, 1966, Ser. No. 575,581
Claims priority, application Switzerland, Sept. 1, 1965, 12,240/65
4 Claims. (Cl. 165—27)

ABSTRACT OF THE DISCLOSURE

A four-conduit heating and air-conditioning system in which hot and cold fluids are delivered alternatively through a single fluid duct, under control of a space thermostat and a valve actuated thereby, to a heat exchanger. The fluid is returned therefrom selectively to corresponding hot and cold fluid return lines under control of a thermostatically operated valve which responds to the temperature of the fluid as selected by the first named valve and before passage through the heat exchanger.

---

The present invention pertains to a heating and air-conditioning system of the four-conduit type with separate supply of cooling and heating fluid to heat exchangers in the spaces or rooms to be heated or cooled. In systems of this kind the spent heating and cooling fluids are delivered from the outlet end of the heat exchangers to separate return lines. In these systems a control device at the inlet to the heat exchanger permits exclusively either heating or cooling fluid to pass into the exchanger, and at the outlet of the heat exchanger a switching device operates to insure that heating fluid will be returned into the return line for heating fluid whereas cooling fluid will be delivered into the return line for that fluid. Heating and air-conditioning systems of the four-conduit type differ from those of the three-conduit type in that in the latter there is provided only a single return line for both heating and cooling fluids. In a three-conduit system, operation may become uneconomical if, for example, in several rooms of the building exposed to strong radiation from the sun the heat exchangers are traversed with cold water as a cooling fluid whereas the exchangers in other rooms on the north side of the building are being provided with hot water. The mixture of hot and cold water in the common return line involves losses of energy.

In four-conduit systems of the type heretofore proposed which is briefly described hereinabove, the control device at the inlet to the heat exchanger takes the form of a sequencing valve. It operates so that over a first range of settings the rate of flow of heating fluid entering the exchanger can be varied from maximum to zero, whereas in an adjacent range of adjustments, reached by further travel of the control element (knob, handle, room thermostat etc.), the rate of flow of cooling fluid into the exchanger will be increased from zero to its maximum. In small installations of this type is can occur that for certain settings of the control device (when set to admit cooling fluid) the cooling fluid will in passing through the exchanger be raised substantially to room temperature. Likewise, when used for heating, the heating medium may on that traverse fall from its inlet temperature substantially to that of the room. This phenomenon is especially likely to occur when the heat exchanger constitutes an element of a so-called air-conditioning convector in which fresh air from a central air-conditioning plant is delivered through nozzle type expansion devices which induce substantial streaming of the air in the room, the heat exchanger being disposed within that stream.

In the four-conduit systems of the prior art above described, the fluid passing through the exchanger must possess a temperature on one side of a limiting value in order to shift the switching valve at the downstream end of the exchanger, and moreover the switching device may exhibit a certain delay in operation. The limiting values for the two directions of shift may of course be different. For either or both of these reasons it can occur that heating fluid may pass through the return line for cooling fluid and vice versa. This will require that the heating and cooling plants both be of larger capacity than would otherwise be necessary.

These phenomena are particularly evident when the switching device operates without power or servo elements, as in the case for example in switching devices employing as a motor a simple thermostatic element exposed to the temperature of the fluid emerging from the exchanger. Thermostatic elements of this kind often employ a body of wax charged with particles of a metal such as copper having a relatively large volumetric coefficient of thermal expansion in the range of temperatures of interest. This may for example be from 18° to 24° C. The coefficient of expansion of the material above and below this range will be substantially lower. There will thus exist a range of temperatures over which the thermostatic element effects a relatively large motion with a substantial power capacity available, so that no supplementary servo system is necessary. These characteristics make it possible to construct valves and switching devices of very compact form.

On the other hand however, it is exactly such wax theremostatic elements which require a temperature change of for example from 3° to 4° C. in order to effect a shift in the position of the valve controlled thereby. It may thus occur, in a heating and cooling system of the type under consideration, that the return lines for the hot and cold fluids will be in communication with each other so that both heating and cooling fluids will penetrate into both return lines. In particular, if there exists a pressure differential between the return line for heating fluid and that for cooling fluid, there can occur an undesired transfer of fluid from one return line into the other, and hence an undesirable cross-mixing of the two fluids throughout the total heating and cooling system.

The invention makes it possible in large measure to surmount these disadvantages. In accordance with the invention the switching device at the downstream end of the heat exchanger in the room to be heated or cooled is controlled by a thermostatic element exposed to the heating or cooling fluid emerging from the control device at the upstream rather than the downstream end of the heat exchanger. Thus with the system of the invention the thermostatic element controlling the switching device at the downstream end of the exchanger responds not to the temperature of the fluid emerging from the exchanger but rather to that of the fluid passing into it. Consequently, with change of the fluid flowing into the exchanger, there is available a large difference in temperature for controlling the downstream switching valve. Under all circumstances, therefore, heating fluid flowing into the exchanger will be directed on exit therefrom into the return line for heating fluid, and cooling fluid emerging from the exchanger will similarly be directed to the return line for cooling fluid. There results moreover a substantial reduction in the time response of the switching device.

Advantageously the thermostatic element of the downstream switching device can be located in the path between the upstream control device and the heat exchanger, this control device being that which determines whether the exchanger will receive heating or cooling fluid. It is however also possible to dispose the thermostatic element in a bypass line extending from a point between the upstream control device and the heat exchanger to a point downstream of the heat exchanger, so that a small fraction of the fluid passing through the upstream control device will flow over the thermostatic element and then directly into the return line selected by the switching device downstream of the heat exchanger.

The invention will now be further described in terms of a number of presently preferred embodiments with reference to the accompanying drawings in which:

FIG. 1 is a schematic flow diagram of a heating and cooling system in accordance with the invention, illustrating however two separate embodiments for control of the downstream device;

FIGS. 2 and 3 are detail sectional views of two embodiments of the switching device of the invention, these being embodiments employed in the system of FIG. 1.

The heating and cooling system schematically shown in FIG. 1 includes two heat exchangers generally indicated at 11 and 12. Each of the exchangers constitutes a space heater and cooler and includes an inlet header 13 and an outlet header 14 which are connected together by means of a plurality of U-shaped tubes 15. Heat transfer plates or fins 16 are fastened to the tubes intermediate their ends. Beneath exchanger is disposed a nozzle chest 17 having nozzles 18. Fresh, cleaned air prepared in a central air-conditioning plant not shown can be delivered to the chests 17 through a line 19, this air so delivered having a suitable temperature and humidity. The air so supplied to the chests streams out through nozzles 18 and thereby entrains in known fashion air from the spaces in the immediate vicinity of the heat exchangers. The resultant mixture of fresh air and space air passes over the plates 16 of the heat exchangers and passes out into the spaces to be air-conditioned in which those heat exchangers are disposed.

Liquid heating or cooling fluid, usually water at suitable temperature, can be supplied to the heat exchangers. Considering the exchanger 11, heating fluid passes out of a riser 20 and through a hot fluid supply conduit or distribution line 21 into a control device 22 having the form of a sequencing valve. This first valve can be alternatively supplied with a cooling fluid, customarily also water at a suitable temperature, from the riser 24 by way of the cold fluid supply conduit or distribution line 23. The sequencing valve 22 is constructed in a manner in itself known so that within a first range of adjustments departing from an end position or setting, the quantity of heating fluid permitted to pass through the valve will vary from a maximum down to zero, no cooling fluid passing through the valve for any setting within this range. Then within a second range of adjustment contiguous with the first range, the quantity of cooling fluid will be varied from zero to a maximum. The adjustment is effected by means of a thermostatic device 25 which is disposed directly on the valve 22 and whose thermostatic element is exposed to room temperature. The set point value can be adjusted at an adjusting ring 26. The thermostatic device 25 provides for elimination of any departure between the room air temperature and the set point value, this result being effected by a supply, via valve 22, of a corresponding quantity of heating or cooling fluid to the heat exchanger connected to that sequencing valve 22.

The outlet of sequencing valve 22 is connected by a line 27 with the inlet header 13, line 27 carrying heating or cooling fluid according to the setting of the sequencing valve. The heating or cooling fluid so arriving passes through the coils 15 and thence into the outlet or downstream collector or header 14, from which it passes through the line 28 into a second valve 29 constituting a downstream switching device. The switching device 29 contains a temperature-responsive element 30 exposed to the stream of fluid flowing through the line or conduit 27. According to the temperature of the fluid passing through the line 27, i.e., accordingly as the fluid is a heating fluid or a cooling fluid, the switching device 29 so adjusts itself that heating fluid will pass out through the line 31 into the return line or conduit 32 for heating fluid whereas cooling fluid will pass through the line or conduit 33 into the return line or conduit 34 for cooling fluid. The return line 32 leads to a heat exchange 35 for reheating the heating fluid and the return line 34 contains an exchanger 36 for recooling the cooling fluid flowing through that return line 34. These heat exchangers are connected by lines 37 and 38 with the corresponding risers 20 and 24.

FIG. 2 shows one embodiment of the construction of the downstream switching device 29. It comprises a housing 41 whose connector 42 leads to the outlet line 28 of the heat exchanger. The housing comprises two additional connectors or terminals 43 and 44 which open via lines 31 and 33 into the return lines 32 and 34 respectively. Inside the housing 41 connector 43 communicates with an outlet chamber 45 for the heating fluid. For the setting of the switching device 41 shown, heating fluid passing in through the connection 42 flows into the space 46 and flows therefrom through a space 47 and into the chamber 45. The opening 47 is defined between a stationary valve seat 48 and a movable valve-closing element 53 supported on a valve spindle 54, FIG. 2 showing the structure in the position which opens the space 47, with spindle 54 at the right end of its travel. The spindle supports a second valve-closing element 52 adapted to cooperate with a stationary valve seat 49 to close off an opening, indicated at 50 when space 47 is fully open. When space 50 is open, fluid flowing into the switching device at connector 42 passes into a chamber 51 and thence out through connector 44. Spindle 54 is in the right-hand position, as seen in FIG. 2, to permit flow of heating fluid, which has passed through the exchanger, from connector 42 to connector 43. It is in its left-hand position to permit flow of cooling fluid from connector 42 to connector 44.

Valve-closing members 52 and 53 are disposed on the common spindle 54 and are respectively pressed by means of springs 55 and 56 against a spacing element 57 fastened on the spindle. Spring 56 bears against the bottom of a counterbore formed in an end plug 58 for the housing 41, and the spring 55 bears against a ring 59. The ring 59 in turn bears against a sliding transfer member 61 movably disposed within a cylinder 60. An encapsulated thermostatic element 62 is screwed into the cylinder 60, the element 62 resting at a shoulder 63 thereof against an adjustable stop 64 which in turn is screwed to the cover 65 of housing or valve body 41. The threaded bore 66 in the cover 65 which accommodates the stop 64 is closed by means of a screw 67. The cylinder 60 is movably supported in a bearing ring 68 screwed into the housing 41 and is sealed to ring 68 by means of an O-ring 69.

The temperature-responsive element 62 contains a mixture of waxes loaded with copper particles to produce an element having a large volumetric thermal expansion coefficient over the range from about 18° to 24° C., whereas its expansion coefficient is smaller above and below these temperatures. The thermostatic element can therefore effect relatively large control motions. These are transmitted by means of a diaphragm or membrane not shown but which is disposed within the capsule of element 62 to a stem 70 inside of the bore 71 of the cylinder 60 into which element 62 is threaded. The motions of the stem 70 are in turn transmitted to a stem 73 on the sliding transfer member 61 and thereby to the ring 59 which serves as support to the spring 55.

Connectors 74 and 75 are provided giving access to the interior 76 of the cover 65 and these connections, as shown in FIG. 1, lead to the line 27. Chamber 76 is thus inserted into that line, and consequently that chamber will be traversed by the heating or cooling medium passing from the control device 22 into the heat exchanger 12. It will be noted that chamber 76 is isolated from the chamber 51 by bearing ring 68.

The apparatus of FIG. 2 operates in the following manner:

For the setting shown in FIG. 2, heating fluid not yet having gone through the heat exchanger 11 passes from the line 27 into the space 76. The relatively high temperature of this heating fluid, which may be for example 45° C., effects an expansion of the thermostatic device 62 such that the spindle 54 is shifted in the direction which opens the valve body at 47. In this position of the switching device 29 therefore, heating fluid passing out of the exchanger 11 flows into the chamber 45 and through the connector 43 into the return line for heating fluid. If now, as might occur in the event of a sudden increase in room temperature, the control device 22 delivers cooling instead of heating fluid to line 27, the chamber 76 in the switching valve of FIG. 2 will be traversed by cold instead of hot fluid, the cold fluid having for example a temperature of 10° C. The copper bearing filling of thermostatic element 62 will then contract, shifting the slider 61 under influence of the spring 55 in the direction toward the element 62, i.e. to the left in FIG. 2, and the spring 55 will be sufficiently relieved so that the spring 56 can shift the spindle 54 to the left. In consequence, the cooling fluid emerging from the exchanger will pass into the chamber 51 and out of that chamber via the connector 44 to the return line for cooling fluid. The changeover temperature point of the valve may be adjusted by rotation of the threaded stop 64.

With the apparatus described, upon a change from heating to cooling fluid effected at the control device 22, there will be an immediate shift of the downstream switching device 29. This is of particular importance in that during a heating up phase for the building, there will be no wrong switchings such as have been particularly troublesome heretofore.

FIG. 1 shows in connection with the second heat exchanger 12 there illustrated another construction of the downstream switching valve 29 of FIGS. 1 and 2, the downstream switching valve associated with exchanger 12 being identified at reference character 83. At the heat exchanger 12 a small part of the flow of heating or cooling fluid is withdrawn upstream of the exchanger through the line 81 at a point between the control device 22 and the collector 13. This fractional flow is directed to the thermostatic device 82 of the downstream switching device 83. This partial stream does not pass through the heat exchanger but rather passes out through the switching device into one of the lines 31 and 33.

FIG. 3 shows the construction of the switching device 83. It is the same as that of the device 29 of FIG. 2 so far as concerns the paths through it of the fluid emerging from the exchanger, i.e. the flow paths between connector 95 and connectors 96 and 97. As to control of the device 83 of FIG. 3, the fluid in the bypass 81, which has not been through the exchanger on this circuit of the system, passes in through the connector 91 into the chamber 92 and there influences in the manner above described a temperature-responsive, i.e. thermostatic element 93. From the chamber 92, the fluid passes through a bore 94 in the housing into the inlet connector 95, which is connected via the line 28 to the outlet end of the heat exchanger. The partial stream branched off through the line 81 then flows according to the setting of the switching device through the connector 96 or 97 into the return line for heating or cooling fluid. Advantageously a throttling valve 98 adjustable by hand may be inserted into the line 81 in order that the quantity of medium drawn off into the bypass channel may be suitably adjusted.

It is desirable in practice for the heating fluid to have a temperature between 30° C. and perhaps 60° C., according to the amount of heat to be supplied, and for the cooling water to have a uniform temperature of about 10° C.

The invention is not restricted to the embodiments disclosed or described. Thus for example it is possible to employ, in place of the switching valves 22, control devices of different construction for control of the heating and cooling fluid. It is also possible to employ for the downstream switching devices other temperature-responsive elements than those having a metallic particle-loaded wax filling. Moreover, the heat exchangers 11 and 12 may also be constructed in a different fashion. For example, in place of the induction streaming effected by the primary air there may be employed a blower for circulation of room air over the heat exchangers.

It will thus be seen that the invention provides heating and cooling apparatus comprising separate hot and cold fluid supply conduits, as shown at 21 and 23 in FIG. 1, and separate hot and cold fluid return conduits, as shown at 31 and 33 in FIG. 1. This apparatus further comprises a heat exchanger as shown for example at 11 or at 12 in FIG. 1 having an inlet terminal as at 13 and an outlet terminal as at 14. It also comprises a first valve, as at 22, having separate inlet terminals each connected to a separate one of those supply conduits and an outlet terminal connected to the inlet terminal of the exchanger. The connection from the outlet terminal of the first valve to the inlet terminal to the exchanger may be direct as in the case of the valve 22 associated with the heat exchanger 12 in FIG. 1. It may, however, be via a line such as the line 27 which passes over the temperature-responsive means 30 for operation of the second valve presently to be described, as illustrated in the case of the valve 22 which in FIG. 1 is associated with the exchanger 11. The apparatus of the invention further comprises thermostatic means as shown at 25 in FIG. 1 to shift the first valve between positions in each of which a separate inlet terminal thereof is connected to the outlet terminal thereof. It further comprises a second valve as illustrated in alternative embodiments at 29 and 83 in FIG. 1 of the drawings. This second valve has an inlet terminal connected to the outlet terminal of the exchanger and separate outlet terminals each connected to a separate one of the return conduits 31 and 33. The apparatus of the invention also comprises temperature-responsive means to shift the second valve between positions in each of which a separate outlet terminal of that second valve is connected to the inlet terminal thereof. In the embodiment of FIG. 2 which illustrates the form of second valve associated with the exchanger 11 in FIG. 1, these temperature-responsive means comprise the thermostatic element 62. In the second valve associated with the exchanger 12, the temperature-responsive means comprise the thermostatic element 93 shown in FIG. 3. The apparatus of the invention further comprises conduit means to expose the temperature-responsive means to fluid flowing from the output terminal of the first valve during flow of that fluid between that outlet terminal and the inlet terminal of the second valve prior to any passage during that flow through the exchanger.

Thus in the embodiment of the invention incorporating the exchanger 11, the conduit means 27 expose the thermostatic element 62 of FIG. 2 to fluid emerging from the associated valve 22 in its flow from the valve 22 to the inlet header 13 of the exchanger 11. In the embodiment incorporating the heat exchanger 12, these conduit means, indicated at 81, expose the thermostatic element 93 of the second valve 83 to fluid emerging from the associated valve 22, which fluid is bypassed around the exchanger. In the preferred embodiments of the invention illustrated, the temperature-responsive element effects directly shift of the second valve between the two positions available thereto.

While the invention has been described herein in terms of a number of preferred embodiments, the invention itself is not limited thereto; rather, the invention comprehends all modifications of and departures therefrom falling within the spirit and scope of the appended claims.

I claim:
1. Heating and cooling apparatus comprising separate hot and cold fluid supply conduits, separate hot and cold fluid return conduits, a space heater and cooler having an inlet and an outlet, a first valve having separate inlets each connected to a separate one of said supply conduits and an outlet connected to the inlet of said space heater and cooler, thermostatic means to shift said first valve between positions in each of which a separate inlet thereof is connected to the outlet thereof, a second valve having an inlet connected to the outlet of said space heater and cooler and separate outlets each connected to a separate one of said return conduits, temperature-responsive means to shift said second valve between positions in each of which a separate outlet of said second valve is connected to the inlet thereof, and conduit means to expose said temperature-responsive means to fluid flowing from the outlet of said first valve during flow thereof between the outlet of said first valve and the inlet of said second valve prior to any passage during said flow through said space heater and cooler.

2. Apparatus according to claim 1 wherein said conduit means extend between the outlet of said first valve and the inlet to said space heater and cooler, whereby the fluid to which said temperature-responsive element is exposed flows, after passage over said element, through said space heater and cooler before reaching the inlet of said second valve.

3. Apparatus according to claim 1 wherein said conduit means bypasses said space heater and cooler.

4. Apparatus according to claim 1 wherein said temperature-responsive element effects directly a shift of said second valve between two positions available thereto.

References Cited

UNITED STATES PATENTS

| | | | |
|---|---|---|---|
| 2,357,706 | 9/1944 | Toepperwein | 165—40 XR |
| 2,381,146 | 8/1945 | Wangenheim | 236—12 |
| 3,170,508 | 2/1965 | Avery | 165—50 XR |
| 3,213,929 | 10/1965 | Marshall | 165—40 XR |
| 3,241,602 | 3/1966 | Andreassen | 165—50 XR |

FOREIGN PATENTS 594,280   4/1934   Germany.

ROBERT A. O'LEARY, *Primary Examiner.*

M. A. ANTONAKAS, *Assistant Examiner.*